United States Patent [19]

Saito et al.

[11] Patent Number: 4,946,614
[45] Date of Patent: Aug. 7, 1990

[54] IONIC CONDUCTOR

[75] Inventors: Yuria Saito, Ikeda; Isao Ogino, Minoo; Osamu Nakamura, Ikeda; Yoshifumi Yamamoto, Suita, all of Japan

[73] Assignee: Agency of Industrial Science & Technology, Tokyo, Japan

[21] Appl. No.: 366,066

[22] Filed: Jun. 14, 1989

[30] Foreign Application Priority Data

Jul. 28, 1988 [JP] Japan ................................. 63-190334

[51] Int. Cl.⁵ .......................... H01M 6/18; H01G 9/02
[52] U.S. Cl. .................................. 252/62.2; 252/518; 252/520; 429/193
[58] Field of Search .................. 252/62.2, 518, 520, 252/408.1; 429/193, 188, 190, 191; 350/357; 423/332, 338, 339, 593; 204/291

[56] References Cited

U.S. PATENT DOCUMENTS

| | | | |
|---|---|---|---|
| 3,713,897 | 1/1973 | Liang | 136/153 |
| 4,007,122 | 2/1977 | Owens | 252/62.2 |
| 4,049,881 | 9/1977 | Rao | 429/50 |
| 4,322,485 | 3/1982 | Harrison et al. | 252/62.2 |
| 4,376,569 | 3/1983 | Barltrop et al. | 252/62.2 |
| 4,394,280 | 7/1983 | Alpen et al. | 252/62.2 |
| 4,434,216 | 2/1984 | Joshi et al. | 252/62.2 |
| 4,512,905 | 4/1985 | Clearfield et al. | 429/193 |
| 4,582,621 | 4/1986 | Bell et al. | 252/62.2 |
| 4,731,705 | 3/1988 | Velasco et al. | 252/62.2 |

OTHER PUBLICATIONS

Mat. Res. Bull., vol. 15, 1691-1701 (1980).

Primary Examiner—Josephine Barr
Attorney, Agent, or Firm—Armstrong, Nikaido, Marmelstein, Kubovcik & Murray

[57] ABSTRACT

An ionic conductor comprising an oxide $Na^+$ ionic conductor represented by the formula $Na_4Zr_2Si_3O_{12}$ and a solid superacid represented by the formula $SO_4^{2-}/ZrO_2$ incorporated therein as a dispersoid.

2 Claims, 5 Drawing Sheets

IONIC CONDUCTOR

BACKGROUND OF THE INVENTION

The present invention relates to an ionic conductor, and more particularly to an ionic conductor remarkably improved in ionic conductivity through incorporation of a particular solid superacid as a dispersoid in $Na_{1+x}Zr_2P_{3-x}Si_xO_{12}$ (wherein $0 \leq x \leq 3$) (hereinafter referred to as "NASICON") known as an oxide $Na^+$ ionic conductor.

The ionic conductor is utilized as a solid electrolyte for cells, sensors, ECD (electrochromic display), etc.

Some brief description will now be given on an improvement in the ionic conductivity through addition of a dispersoid to an ionic conductor.

Ionic conduction occurs as the result of movement of ions in a solid. Therefore, the ionic conductivity is a value depending upon the number of movable ions, the mobility of ions, etc.

When a dispersoid is added to a solid ionic conductor, it attracts certain particular ions from the surface of the solid to form a layer having an apparently changed number of ions.

This layer exhibits higher ionic conductivity in terms of the number of movable ions, mobility, etc. than the solid ionic conductor as the base material, which contributes to an improvement in the ionic conductivity of the solid ionic conductor as a whole.

Various attempts have been made in the art on an improvement in the ionic conductivity through addition of a dispersoid to an ionic conductor. Examples of the attempt include addition of $Al_2O_3$ to LiI [see C.C. Liang, J. Electrochem. Soc., 120, 1289 (1973)]. Further, there is a report on the addition of $Al_2O_3$ to CuCl, $HgI_2$, or the like.

Thus, the improvement in the ionic conductivity of an ionic conductor through addition of a dispersoid has hitherto been limited to the one attained by adding $Al_2O_3$ to an ionic conductor comprising a metal halide.

In this case, it is presumed that conductive ions are attracted to the surface of $Al_2O_3$ by virtue of the dielectric constant of $Al_2O_3$, thereby forming a space charge layer having high ionic conductivity, which contributes to an improvement in the ionic conductivity of the ionic conductor (a so-called dielectric effect of $Al_2O_3$).

SUMMARY OF THE INVENTION

An object of the present invention is to provide an ionic conductor remarkably improved in the ionic conductivity through addition of a particular solid superacid dispersoid to a particular NASICON.

DESCRIPTION OF THE PREFERRED EMBODIMENTS

Figure 1:
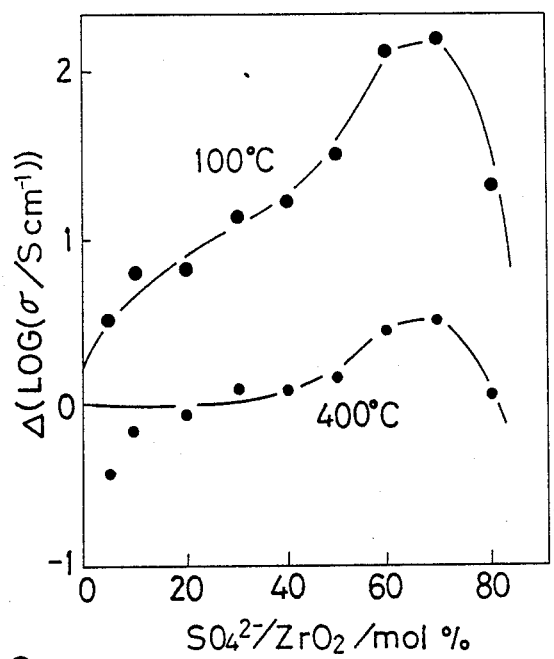
FIG. 1 is a graph showing the relationship between the $SO_4^{2-}/ZrO_2$ solid superacid content and the ionic conductivity of the $Na^+$ ionic conductor of the present invention prepared by the mechanical mixing method.

The ionic conductor of the present invention comprises NASICON wherein x is 3, i.e., an oxide $Na^+$ ionic conductor represented by the formula $Na_4Zr_2Si_3O_{12}$ (hereinafter referred to as "NZS"), and a solid superacid represented by the formula $SO_4^{2-}/ZrO_2$ incorporated therein as a dispersoid.

The concentration of the solid superacid in NZS varies depending upon the process for preparing NZS, and is 50 to 80% by mole, preferably 60 to 70% by mole when NZS is prepared by the mechanical mixing method which will be described later. When the solid superacid concentration is less than 5% by mole, the effect exerted by addition of the dispersoid is small, so that no significant increase in the ionic conductor is observed. On the other hand, when the concentration exceeds 80% by mole, the amount of the dispersoid (insulator) becomes large, which counteracts the effect of increasing the ionic conductivity, so that the ionic conductivity is reduced.

When NZS is one prepared by the sol-gel method which will be described later, the solid superacid concentration is 5 to 50% by mole, preferably 30 to 50% by mole. When the concentration is less than 5% by mole, the increment of the ionic conductivity is small because the amount of the dispersoid is small, while when the concentration exceeds 50% by mole, the ionic conductivity is lowered because the amount of the insulator is increased.

It is believed that the solid superacid $SO_4^{2-}/ZrO_2$ attracts movable $Na^+$ ions present in the ionic conductor by taking advantage of an acid-base reaction and can form a highly ion conductive layer on the surface thereof.

On the other hand, NZS contains the largest amount of $Na^+$ ions in the NASICON and therefore can most easily form a highly ion conductive layer on the surface thereof through addition of a solid superacid. Therefore, it is believed that the extent of the improvement in the ionic conductivity is also large. In particular, the solid superacid $SO_4^{2-}/ZrO_2$ used as a dispersoid in the present invention can increase the ionic conductivity through acid-base interaction at the boundary of contact with an ionic conductor. Since the solid superacid has an acidity 10,000 times higher than that of concentrated sulfuric acid, it is believed that the solid superacid exhibits an effect superior to the action of the solid acid expected in the conventional method wherein $Al_2O_3$ is used as a dispersoid.

The above-described ionic conductor of the present invention can be prepared by mixing NZS with a solid superacid, molding the mixture into an intended shape, and firing the molding.

The NZS is prepared by mixing a sodium salt, a zirconium, and silicon oxide in a stoichiometric amount based on NZS and firing the mixture. The solid superacid $SO_4^{2-}/ZrO_2$ is prepared by treating $Zr(OH)_4$ with sulfuric acid and air-drying and firing the treated product.

The present invention will now be described in more detail with reference to the following Example. Example:

(1) NZS was prepared by the two following methods.

(a) Mechanical mixing method:

$Na_2CO_3$, $ZrO(NO_3)_2.2H_2O$, and $SiO_2$ are weighed so as to have a stoichiometric radio to NZS (Na:Zr:Si=4:2:3). They were well mixed in a mortar. The mixture was fired twice at 1250° C. for 8 hr to prepare a sample.

(b) Sol-gel method:

The same substances as those described in the above item (a) were weighed in a stoichiometric ratio to NZS. First of all, $Na_2CO_3$ and $ZrO(NO_3)_2.2H_2O$ were mixed with each other in the form of an aqueous solution, allowed to precipitate, and slurried. Thereafter, $SiO_2$ was added to the slurry and further well mixed therewith, and the mixture was dried. The dried product was fired twice at 1150° C. for 6 hr to prepare a sample.

(2) The solid superacid $SO_4^{2-}/ZrO_2$ was prepared by the following method.

$Zr(OH)_4$ was put on a filter paper placed on a funnel, and 1 N sulfuric acid was poured thereto. The mixture in the filter paper was then allowed to stand for about one day and air-dried. The sulfuric acid-treated product was fired at 650° C. for 3 hr to prepare a solid superacid. It is believed that the solid superacid has such a form that sulfate ions ($SO_4^{2-}$) are coordinated on the surface of a $ZrO_2$ particle. The acid strength (pKa) was about $-16$ as determined with a Hammett's indicator, i.e., about 10,000 times as high as that of 100% sulfuric acid (pKa: $-11.93$).

(3) Addition of solid superacid to NZS:

The solid superacid prepared in the above-described item (2) was added to the NZS prepared in the above-described item (1) in varied mixing ratios (% by mole) and mixed in a mortar to prepare a plurality of samples.

(4) The plurality of samples prepared in the above-described item (3) were molded into pellets having a size of 10 mm in diameter $\times 2$ mm in thickness with a pressure molding machine. The pellets were fired at 1000° C, and both surfaces thereof were baked at 600° C with a gold paste to prepare a plurality of electrodes.

(5) Measurement of ionic conductivity:

A Cole-Cole plot was conducted through the use of a phase at a frequency ranging from 5 Hz to 500 kHz and the impedance value by the A.C. impedance method, and the ionic conductivity of the pellets prepared in the above-described item (4) was measured by comparison with the equivalent circuit of a ceramic electrolyte.

Figure 2:
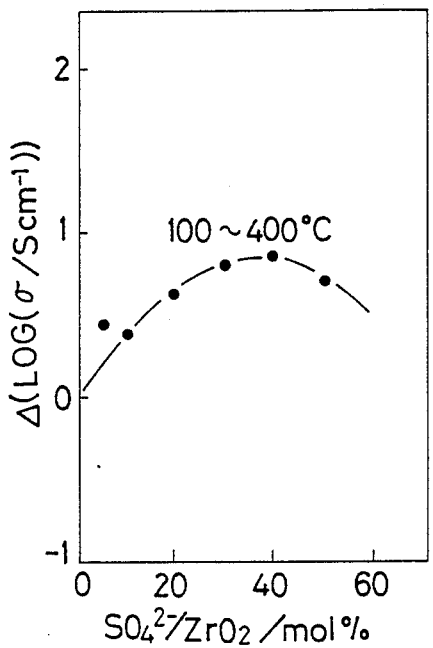
FIG. 2 is a graph showing the relationship between the $SO_4^{2-}/ZrO_2$ solid superacid content ionic conductivity of the $Na^+$ ionic conductor of the present invention prepared by the sol-gel method.

The results are shown in FIGS. 1 and 2.

As is apparent from FIG. 1, the ionic conductor of the present invention prepared by making use of NZS through the mechanical mixing method exhibited at a temperature of 50 to 100° C. an increase in the ionic conductivity by at least about one order of magnitude when the percentage addition of $SO_4^{2-}/ZrO_2$ is 5 to 80% by mole, and in particularly by about two orders of magnitude when the percentage addition is 60 to 70% by mole.

As is apparent from FIG. 2, when NZS prepared by the sol-gel method was used, an equal increase in the ionic conductivity was observed in a measurement temperature range from 50 to 400° C., and the ionic conductivity was increased by about one order of magnitude when the percentage addition of $SO_4^{2-}/ZrO_2$ was 40% by mole. Comparative Example:

$NaZr_2P_3O_{12}$, i.e., NASICON wherein x is 0, was prepared in the same manner as that of the above-described Example.

Further, $Na_3Zr_2PSi_2O_{12}$, i.e., NASICON wherein x is 2, was prepared by both of the mechanical mixing method and the sol-gel method of the Example to prepare two types of samples. Then, 0 to 60% by mole of $SO_4^{2-}/ZrO_2$ prepared in the Example was added to the NASICON wherein x is 0, and pellets were prepared in the same manner as that of the Example to measure the ionic conductivity of the pellets. However, as is apparent from FIG. 3, no increase in the ionic conductivity was observed.

In the case where x is 2, 30% by mole of $SO_4^{2-}/ZrO_2$ was added, and pellets were similarly prepared to measure the ionic conductivity. However, as is apparent from FIG. 4 (mechanical mixing method) and FIG. 5 (sol-gel method), the increase in the ionic conductivity was a little less than double.

Figure 3:
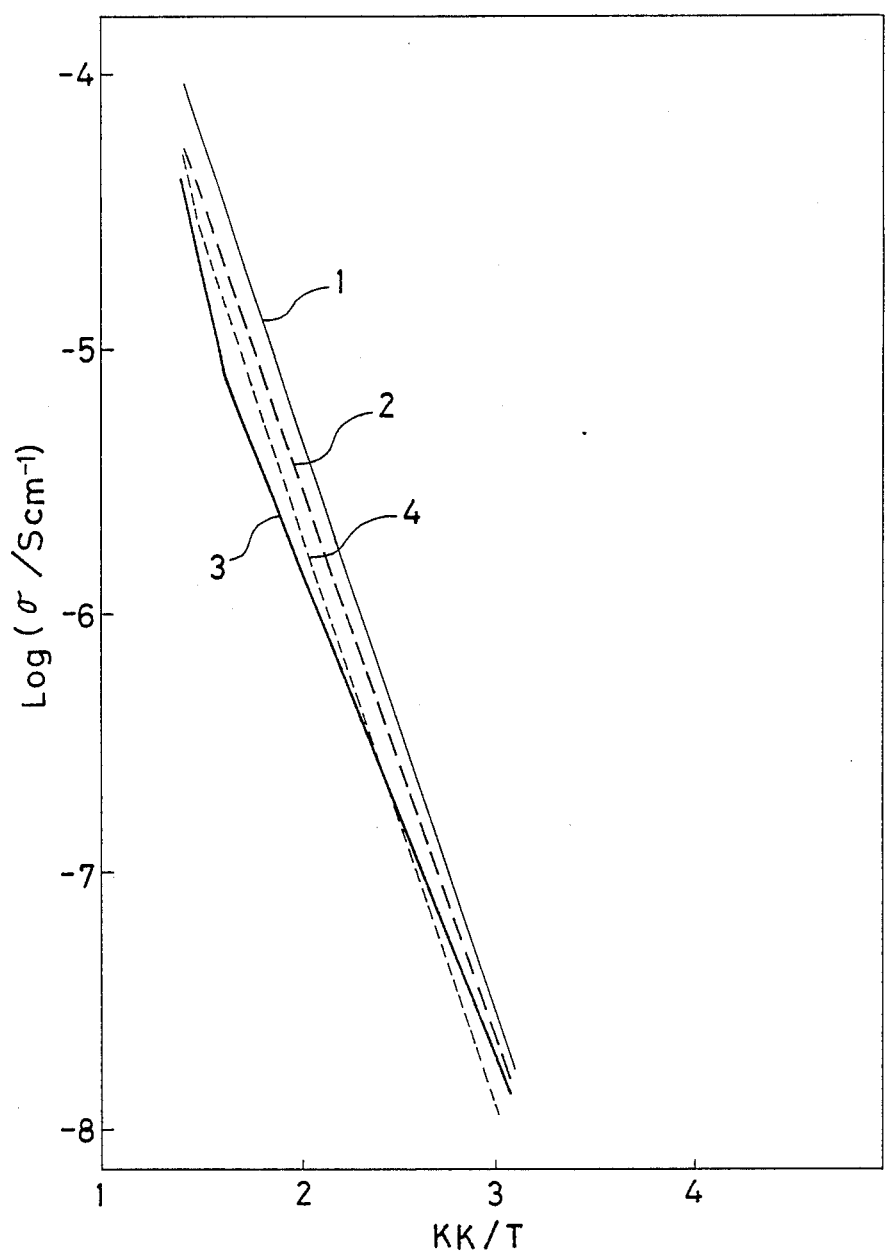
FIG. 3 is a graph showing a change in the ionic conductivity with temperature in the case where different amounts of $SO_4^{2-}/ZrO_2$ solid superacid are added to $NaZr_2P_3O_{12}$ prepared by the sol-gel method.
Figure 4:
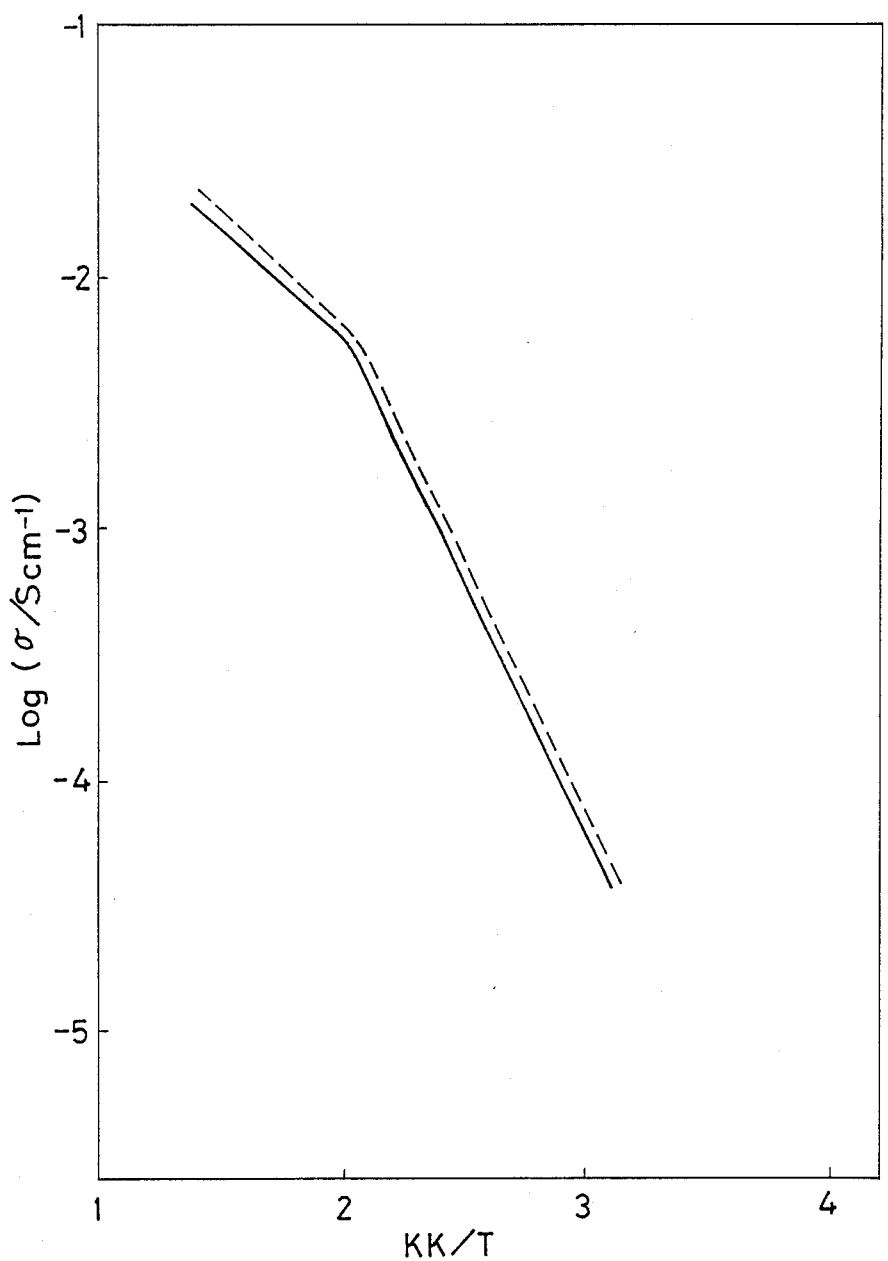
FIGS. 4 and 5 are each a graph showing a change in the ionic conductivity with temperature in the case where a $SO_4^{2-}/ZrO_2$ solid superacid is added to $Na_3Zr_2PSi_2O_{12}$ prepared by the mechanical mixing method in the case of FIG. 4 and the sol-gel method in the case of FIG. 5.
Figure 5:
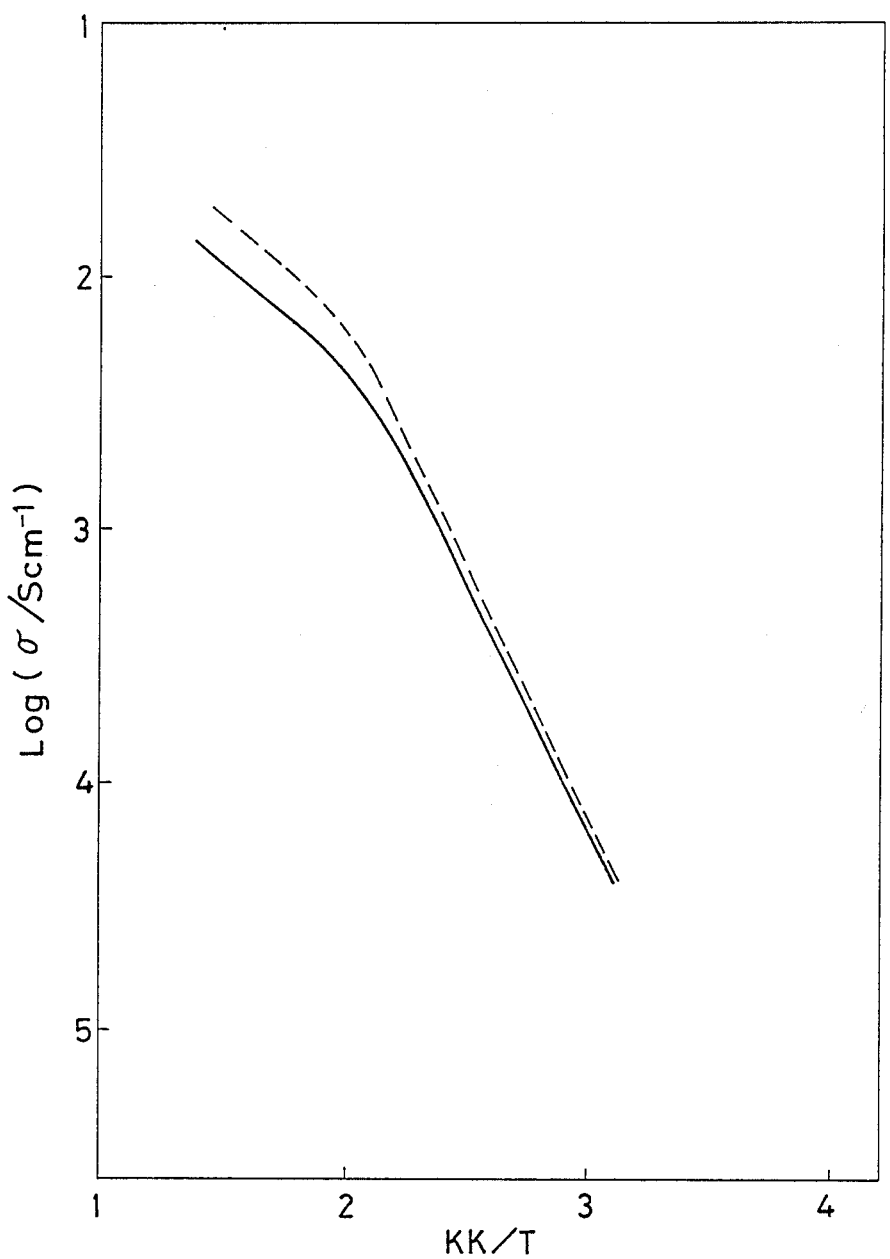

In FIG. 3, a solid line 1 represents the results in the case where the percentage addition of $SO_4^{2-}/ZrO_2$ was 0% by mole, a broken line 2 represents the results in the case where the percentage addition was 10% by mole, a solid line 3 represents the results in the case where the percentage addition was 30% by mole, and a dotted line 4 represents the results in the case where the percentage addition was 60% by mole. In FIGS. 4 and 5, the solid line represents the results in the case where the percentage addition of $SO_4^{2-}/ZrO_2$ was 0% by mole, and the broken line represents the results in the case where the percentage addition was 30% by mole.

Figure 6:
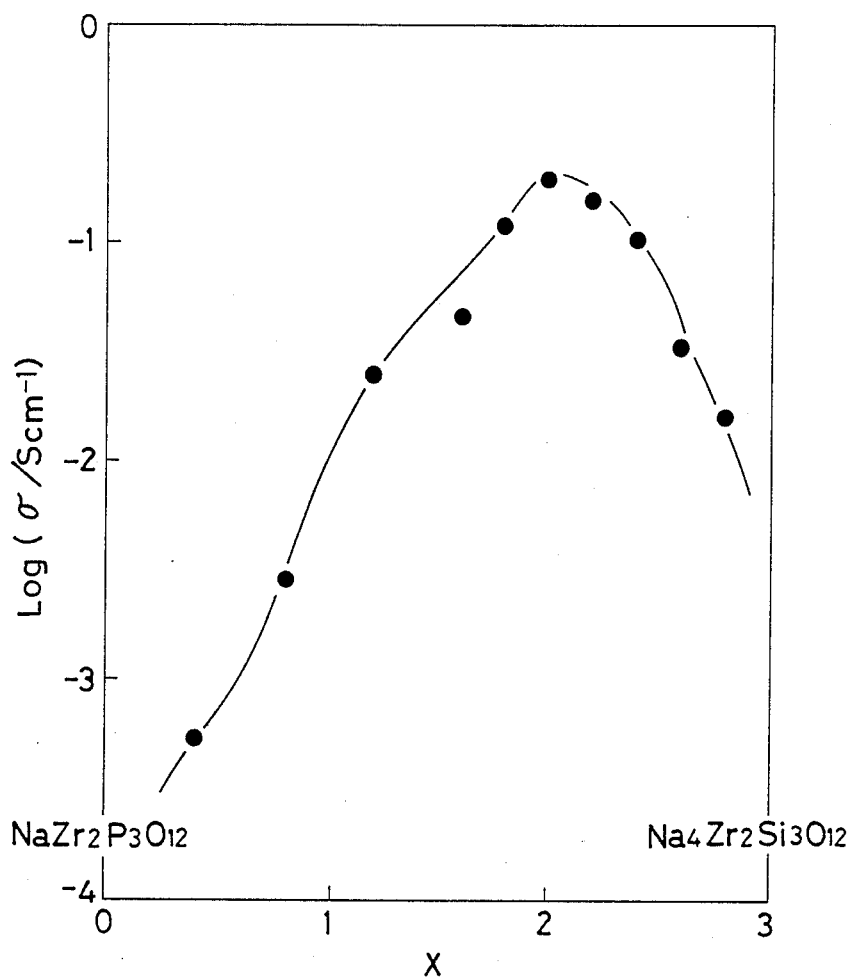
FIG. 6 is a graph showing the relationship between the x value and the ionic conductivity of $Na_{1+x}Zr_2P_{3-x}Si_xO_{12}$ (wherein $0 \leq x \leq 3$).

FIG. 6 is a graph showing the relationship between the x value and the ionic conductivity of $Na_{1+x}Zr_2P_{3-x}Si_xO_{12}$ (wherein $0 \leq x \leq 3$) [see Mat. Res. Bull., 11, 203 (1979)].

What is claimed is:

1. An ionic conductor consisting of a mixed fired product obtained by firing a mixture comprising $Na_4Zr_2Si_3O_{12}$ and a solid superacid represented by the formula $SO_4^{2-}/ZrO_2$, wherein said $Na_4Zr_2Si_3O_{12}$ is prepared by a mechanical mixing method, and the proportion of $SO_4^{2-}/ZrO_2$ to $Na_4Zr_2Si_3O_{12}$ is 5 to 80% by mole 2. An ionic conductor consisting of a mixed fired product obtained by firing a mixture comprising $Na_4Zr_2Si_3O_{12}$ and a solid superacid represented by the formula $SO_4^{2-}/ZrO_2$, wherein said $Na_4Zr_2Si_3O_{12}$ is prepared by a sol-gel method, and the proportion of $SO_4^{2-}/ZrO_2$ to $Na_4Zr_2Si_3O_{12}$ is 5 to 50% by mole.

* * * * *

UNITED STATES PATENT AND TRADEMARK OFFICE
CERTIFICATE OF CORRECTION

PATENT NO. : 4,946,614
DATED : August 7, 1990
INVENTOR(S) : SAITO et al

It is certified that error appears in the above-identified patent and that said Letters Patent is hereby corrected as shown below:

Column 2, line 68, delete "$SO_4{}^{2-/ZrO}{}_2$ and substitute therefor
-- $SO_4{}^{2-}/ZrO_2$ --.

Figure 3, last line, delete "KK/T" and substitute therefor --kK/T--.

Figure 4, last line, delete "KK/T" and substitute therefor --kK/T--.

Figure 5, last line, delete "KK/T" and substitute therefor --kK/T--.

Signed and Sealed this

Twentieth Day of October, 1992

Attest:

DOUGLAS B. COMER

Attesting Officer     Acting Commissioner of Patents and Trademarks